(12) United States Patent
Robb et al.

(10) Patent No.: US 7,069,660 B2
(45) Date of Patent: *Jul. 4, 2006

(54) GRADIENT CALCULATING CAMERA BOARD

(75) Inventors: Michael J. Robb, San Jose, CA (US); Steve L. Glickman, Los Gatos, CA (US); Patrick Brendan O'Mahony, San Jose, CA (US); Manjula Gururaj, Pewaukee, WI (US); David A. Jackson, Point Roberts, WA (US); George M. Gill, Vilonia, AR (US); Eric F. Bryan, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/039,783

(22) Filed: Jan. 24, 2005

(65) Prior Publication Data

US 2005/0126021 A1 Jun. 16, 2005

Related U.S. Application Data

(63) Continuation of application No. 10/624,940, filed on Jul. 23, 2003, now Pat. No. 6,871,409.

(60) Provisional application No. 60/433,997, filed on Dec. 18, 2002.

(51) Int. Cl.
*G01B 11/275* (2006.01)
(52) U.S. Cl. .................. 33/203.16; 33/288; 356/139.09; 701/29; 701/33
(58) Field of Classification Search .................. 33/288, 33/203.18; 382/151; 356/139.09; 701/29, 701/33
See application file for complete search history.

(56) References Cited

U.S. PATENT DOCUMENTS 4,262,220 A 4/1981 Delacruz (Continued)

FOREIGN PATENT DOCUMENTS

EP 1 164 544 A1 12/2001

(Continued)

OTHER PUBLICATIONS

"IMVS-1 157Technical Specifications" Oct. 2002, Fastcom Technology, pp. 1-2 (XP-002279802).

(Continued)

*Primary Examiner*—Christopher W. Fulton
(74) *Attorney, Agent, or Firm*—McDermott Will & Emery LLP

(57) ABSTRACT

In a machine vision system utilizing computer processing of image data, an imaging module incorporates the image sensor as well as pre-processing circuitry, for example, for performing a background subtraction and/or a gradient calculation. The pre-processing circuitry may also compress the image information. The host computer receives the pre-processed image data and performs all other calculations necessary to complete the machine vision application, for example, to determine one or more wheel alignment parameters of a subject vehicle. In a disclosed example useful for wheel alignment, the module also includes illumination elements, and the module circuitry provides associated camera control. The background subtraction, gradient calculation and associated compression require simpler, less expensive circuitry than for typical image pre-processing boards. Yet, the pre-processing at the imaging module substantially reduces the processing burden on the host computer when compared to machine vision implementations using direct streaming of image data to the host computer.

19 Claims, 6 Drawing Sheets

U.S. PATENT DOCUMENTS

| | | | |
|---|---|---|---|
| 5,018,853 | A | 5/1991 | Hechel et al. |
| 5,024,001 | A | 6/1991 | Borner et al. |
| 5,095,252 | A | 3/1992 | Kurth |
| 5,533,139 | A | 7/1996 | Parker et al. |
| 5,535,522 | A | 7/1996 | Jackson |
| 5,600,435 | A * | 2/1997 | Bartko et al. ............ 33/203.16 |
| 5,675,515 | A | 10/1997 | January |
| 5,724,128 | A | 3/1998 | January |
| 5,724,743 | A | 3/1998 | Jackson |
| 5,809,658 | A | 9/1998 | Jackson et al. |
| 5,870,315 | A | 2/1999 | January |
| 5,943,783 | A | 8/1999 | Jackson |
| 5,949,901 | A | 9/1999 | Nichani et al. |
| 5,969,246 | A | 10/1999 | Jackson et al. |
| 6,041,148 | A | 3/2000 | Wilt |
| 6,064,750 | A | 5/2000 | January et al. |
| 6,118,485 | A | 9/2000 | Hinoue et al. |
| 6,134,792 | A | 10/2000 | January |
| 6,148,528 | A | 11/2000 | Jackson |
| 6,219,134 | B1 | 4/2001 | Voeller et al. |
| 6,237,234 | B1 | 5/2001 | Jackson et al. |
| 6,252,973 | B1 | 6/2001 | January et al. |
| 6,269,194 | B1 | 7/2001 | Nichani |
| 6,282,469 | B1 | 8/2001 | Rogers et al. |
| 6,298,284 | B1 | 10/2001 | Burns, Jr. et al. |
| 6,323,776 | B1 | 11/2001 | Jackson et al. |
| 6,509,962 | B1 | 1/2003 | Burns, Jr. |
| 6,658,749 | B1 | 12/2003 | Jackson et al. |
| 6,658,751 | B1 | 12/2003 | Jackson et al. |
| 6,690,456 | B1 | 2/2004 | Bux et al. |
| 6,710,866 | B1 | 3/2004 | Adolph |
| 6,754,562 | B1 | 6/2004 | Strege et al. |
| 6,871,409 | B1 * | 3/2005 | Robb et al. ................... 33/288 |
| 6,892,216 | B1 | 5/2005 | Coburn, II et al. |
| 2001/0007086 | A1 | 7/2001 | Rogers et al. |
| 2002/0001076 | A1 | 1/2002 | Jackson et al. |
| 2002/0020071 | A1 | 2/2002 | Jackson et al. |
| 2002/0023361 | A1 | 2/2002 | Jackson et al. |
| 2002/0027651 | A1 | 3/2002 | Jackson et al. |
| 2002/0050518 | A1 | 5/2002 | Roustaei |
| 2002/0051216 | A1 | 5/2002 | Hudson et al. |
| 2002/0092183 | A1 | 7/2002 | Jackson |
| 2002/0099483 | A1 | 7/2002 | Jackson et al. |
| 2002/0109112 | A1 | 8/2002 | Guha et al. |
| 2002/0176605 | A1 | 11/2002 | Stafsudd et al. |
| 2004/0246470 | A1 | 12/2004 | Burns et al. |
| 2005/0154497 | A1 | 7/2005 | Strege et al. |

FOREIGN PATENT DOCUMENTS

| | | |
|---|---|---|
| WO | WO 95/07000 | 3/1995 |
| WO | WO 97/42756 | 11/1997 |

OTHER PUBLICATIONS

"IMVS Image Processing Basic Package", Summary, Version 1.9, Dec. 2001, Fastcom Technology, pp. 1-12 (XP-002279803).

"Imvs Image Compression Package", Summary, Version 1.9, Fastcom, Dec. 2001, pp. 1-8 (XP-002279804).

"Legend 500 Series Product Information", DVT Corporation, 2001, pp. 1-2 (XP-002279805).

"FrameWork Product Information", DVT Corporation, Nov. 11, 2002, pp. 1-4, (XP-002279806).

Zuech, N., "Are Smart Cameras Smart Enough?", Machine Vision Online, Jan. 2001, pp. 1-4 (XP-002214185).

Lecerf A. et al., "Computer Vision Camera with Embedded FPGA Processing", Proceedings of SPIE, vol. 3966, Jan. 24, 2000, pp. 299-308 (XP-008009788).

"BCi5 CMOS Camera Product Specification", C-Cam Technologies, Nov. 4, 2002, pp. 1-2 (XP-002293125).

"MachineCam Area Scan Digital Vision System Product Specification", Wintriss Engineering Corporation, 2001, pp. 1-2 (XP-002293126).

Andrew Wilson, "Product Focus: Embedded Chips in Advanced Cameras Boost System Operation", Vision Systems Design, Dec. 1999, pp. 1-4 (XP-002293133).

Robotics World, May 2001, "Improvements in Machine Vision Give Robots Affordable, Reliable Eyeight", Michael E. Williams, DVT Corp. (3 pages).

PerkinElmer Optoelectronics Product Literature, "MVS-4000—Machine Vision Strobe", Jun. 2001 (2 pages).

Circuit Diagram—Universal Xenon Flash Transmitter—Opto-isolator Trigger, David Johnson & Associates, Jun. 9, 2000 (1 page).

Sensors—Jun. 2001—"Advances in Machine Vision for Robot Control", Phillip J. Heil et al., DVT Corp. (4 pages).

Cognex 2001 Press Release—"Cognex Corporation Adds Ethernet/IP to Networkable In-Sight Vision Sensors", Aug. 13, 2001 (3 pages).

VCSBC4018 Specification Sheet, Vision Components GmbH, downloaded Jul. 28, 2005 from http//www.vision-components.com.

VC4038 Specification Sheet, Vision Components GmbH, downloaded Jul. 28, 2005 from http//www.vision-components.com.

Important Functions of the VC Image Processing Library VCLIB, Vision Components GmbH, downloaded Jul. 28, 2005 from http//www.vision-components.com.

VC20XX Smart Cameras, Vision Components GmbH, downloaded Jul. 28, 2005 from http//www.vision-components.com/content/category/16/106/80.

* cited by examiner

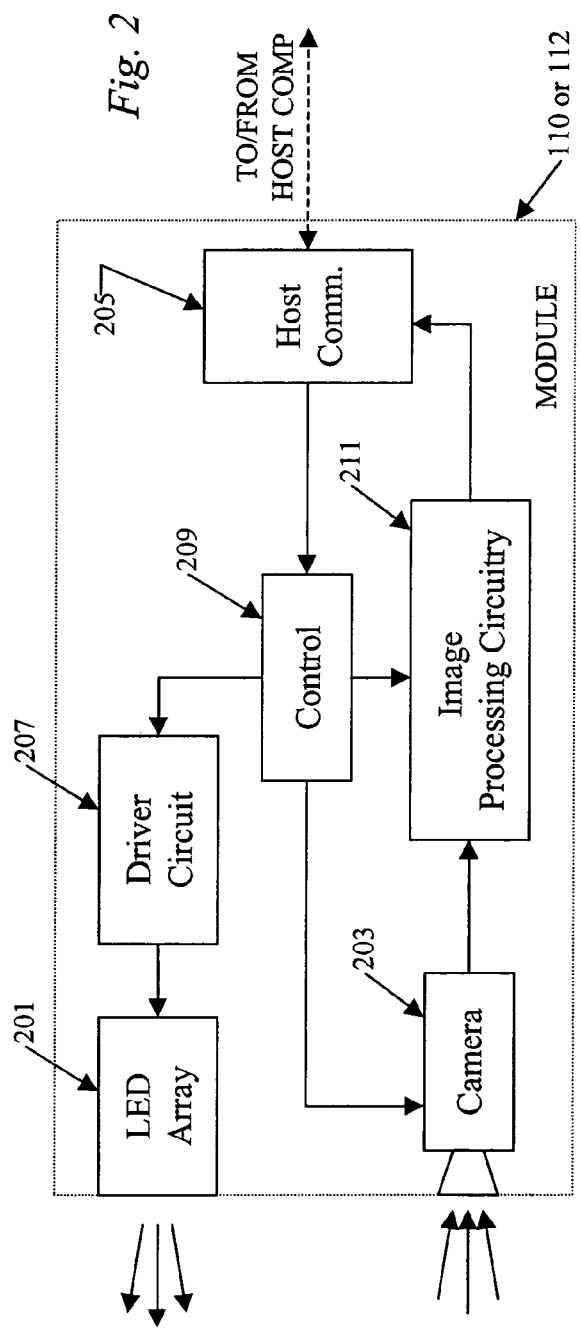
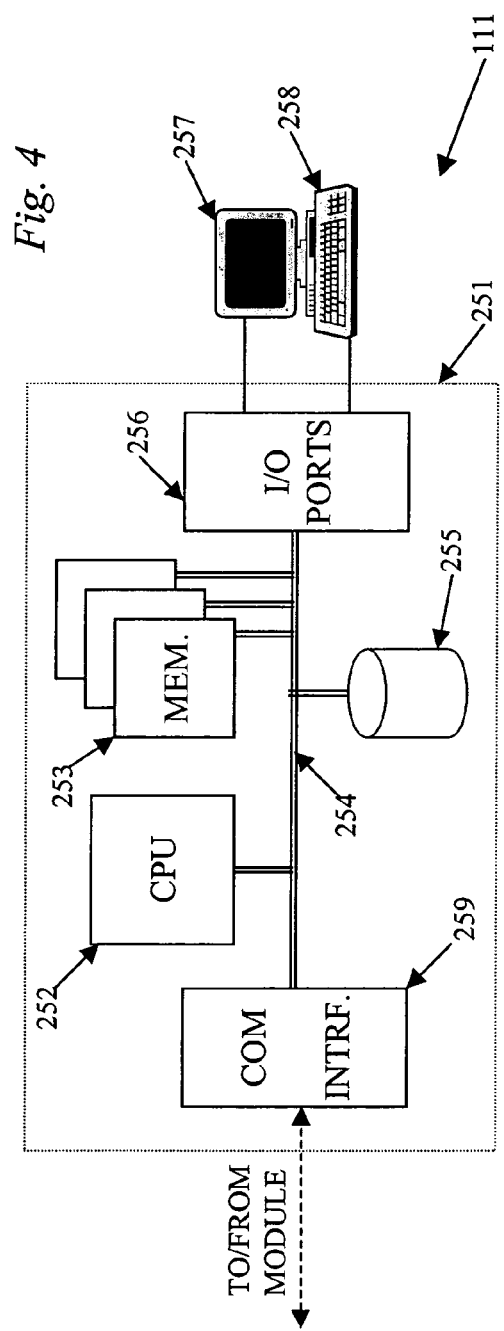

GRADIENT CALCULATING CAMERA BOARD

RELATED APPLICATION

This application is a continuation of application Ser. No. 10/624,940 filed Jul. 23, 2003, issued Mar. 29, 2005 as U.S. Pat. No. 6,871,409, which claims priority from U.S. Provisional Application No. 60/433,997 entitled "Gradient Calculating Camera Board" filed on Dec. 18, 2002, the disclosure of which is entirely incorporated herein by reference.

TECHNICAL FIELD

The present subject matter relates to a technique for processing image signals for input to a computer or the like, for machine vision and similar applications, which utilizes a gradient calculation and/or a background subtraction.

BACKGROUND

An increasing variety of industrial applications involve machine vision measurements taken by processing image data from cameras. For example, wheels of motor vehicles may be aligned on an alignment rack using a computer-aided, three-dimensional (3D) machine vision alignment apparatus. In such a technique, one or more cameras of the alignment apparatus view targets attached to the wheels of the vehicle. The cameras form images of the targets, and a computer in the alignment apparatus analyzes the images of the targets to determine wheel position. The computer guides an operator in properly adjusting the wheels to accomplish precise alignment, based on calculations obtained from processing of the image data.

Examples of methods and apparatus useful in 3D alignment of motor vehicles are described in U.S. Pat. No. 5,943,783 entitled "Method and apparatus for determining the alignment of motor vehicle wheels;" U.S. Pat. No. 5,809,658 entitled "Method and apparatus for calibrating cameras used in the alignment of motor vehicle wheels;" U.S. Pat. No. 5,724,743 entitled "Method and apparatus for determining the alignment of motor vehicle wheels;" and U.S. Pat. No. 5,535,522 entitled "Method and apparatus for determining the alignment of motor vehicle wheels."

A wheel alignment system of the type described in these references is sometimes called a "3D aligner" or "aligner." An example of a commercial vehicle wheel aligner is the Visualiner 3D, commercially available from John Bean Company, Conway, Ark., a unit of Snap-on Tools Company. Of course, the 3D wheel aligner discussed above is described here as just one example of a system utilizing machine vision in a commercial application.

In a 3D aligner and in other applications involving machine vision, there is a substantial amount of processing required to interpret camera images. In current machine vision systems, such as the 3D aligners, there are two general ways to process the video image signals from the cameras, both of which have limitations or problems.

The most common image processing technique in industrial machine vision applications utilizes a dedicated video processing module, comprising hard-wired and other processing devices specifically designed and adapted to process the image data before input of processed results to the host computer. In alignment systems, for example, such a board processes signals from one or more cameras to produce target orientation results or possibly even alignment numbers, for display and/or further processing by the host computer. However, video processing boards often require use of complex, expensive processors to perform all of the necessary calculations required for the image algorithms.

The alternative approach to processing image data for machine vision applications involves streaming image data from the camera(s) to an image capture board whose image memory is accessible by the host computer. The host computer, in turn, performs all of the processing of the image data, which would otherwise be done on the dedicated video processing module, to obtain the necessary calculation results. However, the amount of processing required is quite large and imposes a substantial burden on the central processing unit of the host computer. Such intense processing may unacceptably slow down operation of the host computer. If the particular machine vision application requires processing of images from multiple cameras, the amount of the data to be handled and the attendant number of necessary calculations may overwhelm the host computer.

SUMMARY

Hence a need exists for an enhanced technique for performing the image data processing for machine vision applications in a manner that requires at most a minimal amount of specialized processing hardware and yet does not require the host computer to perform an excessive number of related calculations. As disclosed herein, circuitry associated with the image sensor, typically in a sensor module, performs pre-processing of the data before transmission thereof to a host computer.

One image-processing task for machine vision applications involves the identification and accurate measurement of the boundaries of objects in the image. Properties of objects, such as area, centroid, and other relevant parameters may then be determined from these boundary measurements. Such objects are often characterized as groups of pixels having significantly different intensities than surrounding pixels, and their boundaries are at the peak of the gradient of the image. To support such an image-processing task, it is useful to perform a pre-processing at the image module to obtain the gradient of the image.

Another image pre-processing operation is background subtraction. In a wheel alignment example, objects of interest in the image are produced by a source of illumination adjacent to the camera. To remove other objects, a background image is acquired by the camera, for example, without this illumination. Then a foreground image, e.g. with illumination present, is acquired. This foreground image has both the objects produced by the illumination and the other objects. A pixel-by-pixel subtraction of the background image from the foreground produces an image containing only the objects of interest. For this subtraction process, an image memory buffers the background image, and a processing device performs the subtraction. If gradient processing is provided, the background subtraction is performed before gradient calculation.

If separate devices are used to perform subsequent processing on the pre-processed image data, compression may be used at the imaging module, to reduce the inter-device bandwidth requirements for transmission of the pre-processed data to the host computer. Ideally, these operations (background subtraction, gradient calculation and compression) are performed at the incoming image data rate, so that there are no delays or requirements for additional buffer memory.

The concepts disclosed herein alleviate the above noted problems and address the stated needs relating to processing of image data in machine vision applications. One disclosed technique involves gradient calculation in response to image data from one or more image sensors. In a disclosed example, an imaging module includes an image sensor as well as elements for illumination and gain control. The imaging module performs the gradient calculation and may compress the resultant gradient data stream for transmission to a host computer for further processing, for example in a pipelined fashion, at the data rate of the image sensor. The gradient calculation is performed on every pixel.

The example does not require foreground image pre-buffering. The resultant gradient data stream significantly reduces the amount of data to be transmitted to the host computer (and thus the transmission bandwidth) as well as the number of subsequent calculations performed by the host computer. Consequently, the connection between the host computer and the module may utilize a simple connection methodology, such as USB 1.0 or 2.0, and the processing performance requirements for the computer can be significantly reduced. However, because of the relative simplicity of the gradient pre-processing, the module does not require as complex (or expensive) hardware as currently available image processing boards. This reduces cost yet leaves the host computer with capacity to run other applications, or accept data from larger numbers of cameras, or both.

Another disclosed technique involves performing a background subtraction in response to image data from one or more image sensors. In a disclosed example, an imaging module includes an image sensor as well as elements for illumination and gain control. The imaging module performs the background subtraction and may compress the resultant data stream for transmission to a host computer for further processing. The processor in the exemplary module may also perform a gradient computation, based on the result of the background subtraction.

In the disclosed example, the "background" image is taken without illumination, whereas the "foreground" image is taken with illumination. The image data that remains after the background (light off) image is subtracted from the foreground (light on) image corresponds to the elements in the field of view that are illuminated by and highly reflective to the light from the illumination source. Such a subtraction takes out distracting objects, for example, objects not relevant to a wheel alignment application.

In the examples, a number of other improvements are contemplated for the imaging module of a vehicle alignment system. In one such improvement, the imaging module includes a field programmable gate array (FPGA) coupled to the image sensor circuit, for pre-processing the digitized images. A communication interface, such as a USB 2.0 interface, sends the pre-processed image data to the host processor. In an example of this arrangement, the USB interface is part of an integrated circuit, which also includes the micro controller of the imaging module.

Another improvement in the image sensing module involves providing active cooling, particularly for the image sensor circuit. In the example, a temperature sensor provides feedback data to the micro-controller, which controls a Peltier device or thermoelectric cooler arranged to cool the camera circuit.

Yet a further improvement in the image sensing module involves optically isolating the strobe circuit. The module typically comprises an image sensor circuit, an electronic strobe circuit, a controller circuit coupled to the image sensor circuit and the electronic strobe circuit, and a communication interface circuit. At least one optical isolator is coupled to the electronic strobe circuit, for optically isolating the strobe circuit from the other circuits of the image sensing module. The optical isolation of the strobe circuit from the other circuits prevents the power from the strobe circuit feeding back into the logic circuits and damaging the logic circuits.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 is a simplified functional block diagram of an imaging module, which may be used in the machine vision system of FIG. 1.

FIG. 4 is a simplified functional block diagram of a personal computer implementation of the host computer of the machine vision system of FIG. 1.

DETAILED DESCRIPTION

The various examples disclosed herein relate to systems and techniques for implementing machine vision in an enhanced manner by providing an imaging module having an image sensor as well as associated pre-processing circuitry. In the examples, the pre-processing circuitry in the imaging module a background subtraction and/or a gradient calculation. The pre-processing circuitry or other means in the imaging module may also provide data compression for reduced bandwidth communication to a host processor. Reference now is made in detail to the examples illustrated in the accompanying drawings.

Figure 1:
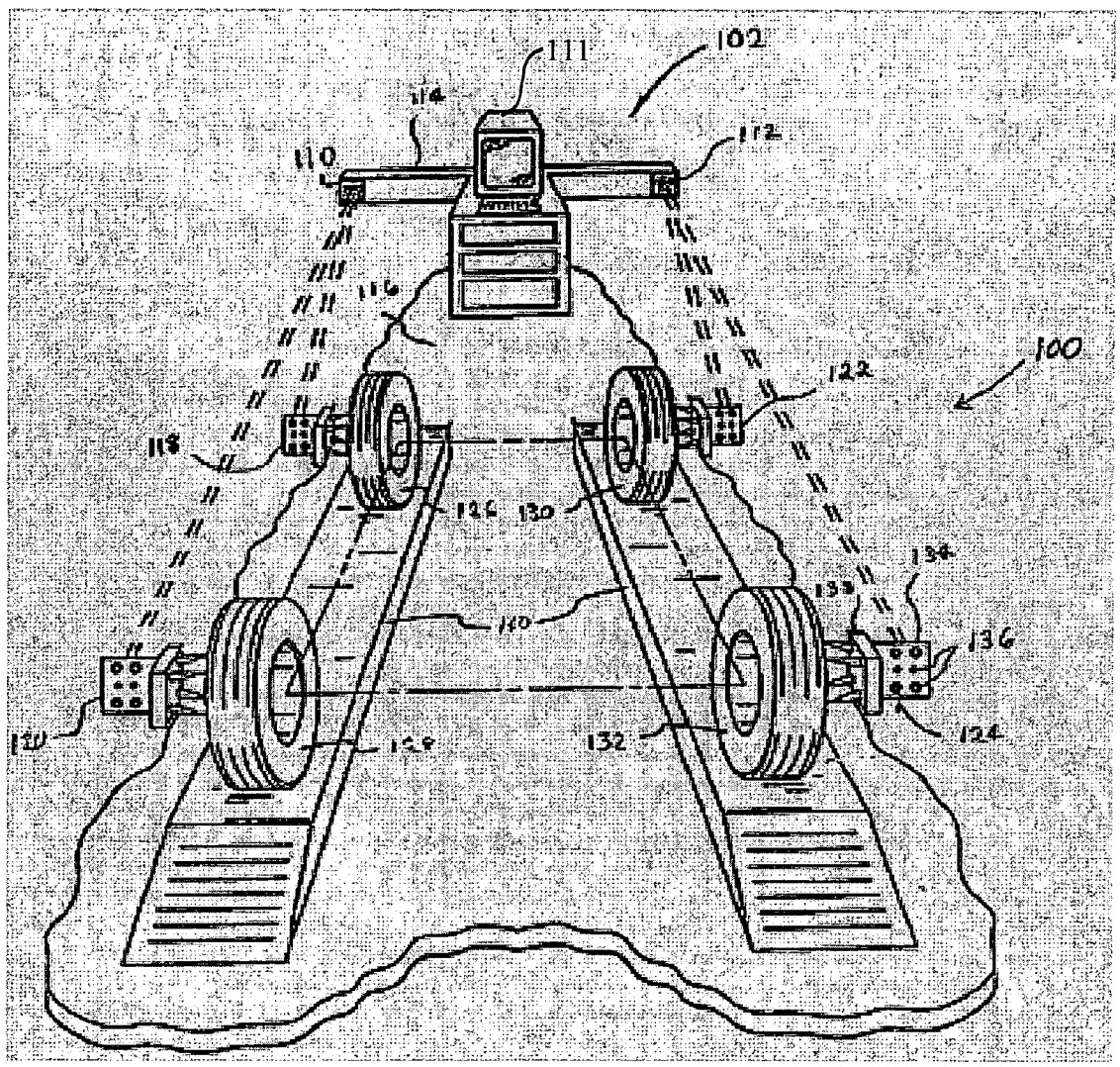
FIG. 1 a perspective view of a wheel alignment system utilizing machine vision, which may incorporate the gradient calculating and compression elements into the imaging modules.

The concepts discussed herein are applicable in a variety of different types of machine vision systems. For purposes of discussion, it may be helpful to consider a specific example of a machine vision system, such as a 3D aligner as illustrated in FIG. 1, before going into the details of the imaging module.

In the example shown, the aligner system 100 consists of three major components. The first of these elements is an illumination and imaging system 102. This portion of the system comprises two imaging modules 110, 112. Each of the imaging modules 110, 112 includes a light emitter or illumination system (typically a strobe). Each of the imaging modules 110, 112 also includes an image sensor, typically in the form of a digital camera. Essentially, each camera forms an image of objects within its field of view, which in operation includes one or more targets; and in response to the image each camera generates digital image data. As discussed more, later, each of the imaging modules 110, 112 includes circuitry for processing of the digital image data to perform the gradient calculations and the compression of the gradient data.

Each light emitter takes the form of an array of strobed (flashing) red LEDs mounted around the aperture of one of the cameras. The exemplary system uses high-resolution digital cameras. The imaging modules 110 and 112 are mounted at opposite ends of a horizontal beam 114. In the wheel alignment application, the beam provides desired separation between the modules, to allow the desired view of the vehicle wheels from opposite sides. The height of the beam, and thus the height of the cameras in the modules 110 and 112, may be fixed or adjustable. The structure of the beam 114 and the structure for supporting the beam 114 are not significant for purposes of this discussion. Those skilled in the art will recognize that machine vision applications, including wheel alignment, may use a single imaging module or use more than the two modules 110, 112 shown in the example.

The second major element of the aligner 3D system is a set of four passive heads, 118, 120, 122 and 124 for attachment to the vehicle wheels 126, 128 130 and 132. Each head includes a wheel-rim clamp and an attached target object. In the example, each target object has a planar surface with a plurality of visually perceptible, geometrically configured, retro-reflective target elements, which appear as a pattern of reflective circles or dots of different sizes on the planar surface. Examples of target bodies 134 and target elements 136 acceptable for use in wheel alignment applications are described in U.S. Pat. No. 5,724,743. Other target designs may be used for wheel alignment, for example with different visually perceptible target elements 136; and those skilled in the art will recognize that other machine vision applications involve imaging of different types of targets or imaging of object features.

In the wheel alignment application, targets 118, 120, 122, 124 are mounted on each of the wheels 126, 128, 130, 132 of the motor vehicle. Each target 118, 120, 120, 124 includes a target body 134, target elements 136, and an attachment apparatus 138. The target elements 136 are positioned on the target body 134. The attachment apparatus 138 attaches the target 118, 120, 120, 124 to wheel 126, 128, 130, 132, respectively. An example of an attachment apparatus is described in U.S. Pat. No. 5,024,001, entitled "Wheel Alignment Rim Clamp Claw" issued to Borner et al. on Jun. 18, 1991, incorporated herein by reference. Of course other mounting arrangements may be used.

The beam 114 supporting the imaging modules 110 and 112 has a length sufficient to position the cameras in the modules 110, 112 respectively outboard of the sides of the vehicle to be imaged by the position determination system 100. Also, the beam 114 positions the cameras in the modules 110, 112 high enough above the wheels to ensure that the two targets 118, 120 on the left side of the vehicle are both within the field of view of the left side camera in module 110, and the two targets 122, 124 on the right side of the vehicle are both within the field of view of the right side camera in module 112.

The other major element of the aligner system 100 is a programmed computer or host 111, typically a personal computer or similar programmable data processing device. In a typical implementation, the computer 111 includes a processor, a keyboard, a mouse, a printer and a color display monitor, as will be discussed in more detail, later. In the wheel alignment example of machine vision, the computer 111 is programmed to receive and process the compressed image gradient data from the imaging modules 110 and 112. The host computer 111 processes the received data to calculate alignment parameters for a vehicle and to provide a graphical three-dimensional representation of those parameters as a display to a mechanic. In general, the host processing system 111 processes the compressed gradient information to derive positional data regarding position of the visually perceptible target elements from the camera images; and the host processing system 111 processes the positional data to determine one or more wheel alignment parameters of the vehicle under test. The computer 111 also offers a variety of other information useful in adjusting vehicle alignment. The computer also provides the user interface for operation of the system.

In operation, once the wheel aligner system 100 has been calibrated in a known manner, a vehicle can be driven onto the rack 140, and, if desired, the vehicle lifted to an appropriate repair elevation. The targets 118, 120, 122, 124, once attached to the wheel rims, are then oriented so that the target elements 136 on the target body 134 face the camera in the respective module 110 or 112. The camera height may be fixed or adjustable to correspond to lift height. The vehicle and model year can then be entered into the computer 111 along with other identifying parameters, such as vehicle VIN number, license number, owner name, etc.

To take measurements, the mechanic begins by operating the system 100 to take a first set of images of the targets 118, 120, 122 and 124. The mechanic then rolls the vehicle back a slight distance, up to eight inches; and the system 100 takes another set of images of the targets 118, 120, 122 and 124. Finally, the mechanic rolls the vehicle forward to its initial position, and the system 100 takes more images. For each of the images, the processing in the respective module 110 or 112 forms gradient data, compresses the data and forwards the resultant data to the host computer 111. For example, from the position and orientation of the target in the images taken at the various positions, the computer 111 calculates the actual position and orientation of each wheel axis, including certain alignment parameters such as toe, camber, thrust angle and setback.

In the exemplary system 100, one camera is referenced to the other, so that the host computer 111 utilizes a single coordinate system for modeling the vehicle under test. It is not necessary that the supporting rack 140 be level or even that all wheels lie within the same plane. For each vehicle, the computer 111 defines a reference plane that passes through the centers of rotation of the wheels (called "claw points" because they are the center of the points where the claws of the target assembly grip the wheel rims) as determined from the two test images taken at different positions of the wheels. Since one of these claw points may not lie in the plane defined by the other three, some liberties must be taken. For example, for the purpose of aligning the front wheels 126, 130, the computer 111 defines a reference plane as that formed by the measured claw point location of each of the two front wheels and a point midway between the measured claw point locations of the rear wheels 128, 132. Front wheel alignment calculations then are referenced to this individually measured plane. A similar technique may be used to reference measurements and adjustments with respect of the rear wheels.

The front wheels 126, 130 of the vehicle may rest on turntables (not shown), so that the mechanic can operate the steering wheel of the vehicle to change the positions of the front wheel during alignment operations. For example, the mechanic will operate the system 100 to take an image of the targets 118, 120, 122 and 124 with the wheels 126, 130 turned to one side. The mechanic then turns the wheels 126, 130 to the other side; and the system 100 takes another image of the targets 118, 120, 122 and 124. From the position and orientation of the front targets 118, 120 in these images taken at the two turned positions, the computer 111 calculates the steering axis about which each front wheel 126 or 130 turns.

Once all measurements are complete, the computer 111 generates a visual output of the measured alignment parameters and/or provides data relating to adjustments needed to bring the alignment parameters back to original manufacturer's specifications. The computer 111 stores manufacturers' specified values and tolerances for the alignment parameters, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system 111 can provide visual displays and/or printouts, for purposes of billings, reports to the customer, etc.

The block diagram in FIG. 2 provides a high level illustration of the functional elements of an example of one of the imaging processing modules 110, 112, for use in the wheel alignment type system 100, using machine vision as outlined above relative to FIG. 1. The illustrated module includes an LED array 201, serving as an illuminator, to emit light for desired illumination of the targets of the wheel alignment system. The elements of the module (FIG. 2) may be built on a single circuit board, although in some implementations, the LED array is a separate replaceable component of the module. The illustrated module also includes a high-resolution digital camera 203, which incorporates the machine vision image sensor.

A host computer communication interface 205 provides two-way data communications for the components of the imaging module 110 or 112 with the host computer 111 (FIG. 1). The host communications interface 205 conforms to an appropriate data protocol standard and provides a coupling to a desired physical media, to enable data communication to and from the host computer at desired speeds and in a manner desired for the particular installation. In a typical shop installation for wheel alignment, the host communications interface 205 is a USB interface with a USB connector for cable connection to a matching interface in the host computer 111. Of course those skilled in the art will recognize that other data communications interfaces may be used in wheel alignment systems or in other machine vision applications. For example, if it is desirable in a particular application for the user to have a portable terminal, the host may be a laptop or handheld device, in which case it may be advantageous to use an interface 205 facilitating wireless communications with the host.

In addition to the LED array 201, the camera 203 and the host communication interface 205, the module includes circuitry 207 for driving the array 201 to emit light. The driver circuit 207 is coupled to the host communication interface 205, to enable the host computer system 111 to instruct the driver circuit 207 when to activate the array 201 and possibly the desired intensity of the illumination. In response to instructions from the host, the driver circuit activates the LED array 201, and when necessary, adjusts the intensity of the light emitted by the array.

The module 110 or 112 may also include one or more control circuits 209. Although the control(s) may be incorporated in one or more of the illustrated elements of the module, for ease of discussion, the control 209 is shown as a single logically separate element. The control 209 is responsive to commands or the like received from the host via the communication interface 205, to provide control signals to the various elements in the imaging module 110 or 112. For example, in response to instructions from the host computer, the control 209 can provide control signals to the camera 203 to set the aperture exposure time thereof or to set a gain for the signal processing performed within the camera, so as to increase or decrease the sensitivity and thus the average pixel intensity level of the data output by the camera 203. The control 209 also activates the camera 203 in response to control data from the host computer system 111, received via the host communication interface 205, so as to form images and provide image data at times specified by the host computer system.

The control 209 may also provide control signals to the LED driver circuit 207, for example, to control the timing and amount of illumination emitted from the LED array 201. As noted, the control 209 is responsive to commands from the host computer system, hence, the control 209 enables the host to specify when to activate the array 201 and possibly the desired intensity of the illumination.

In operation, the camera 203 outputs a digital value of each image pixel based on analog intensity of the sensed light at the point in the image corresponding to the pixel. The value is digitized and read out. To get higher output values, the camera gain is increased, to effectively multiply the output of the CMOS sensor. Alternatively, the aperture (lens iris diameter) is opened or the sensor light collecting time is lengthened, to increase sensitivity and thereby obtain higher-value output data.

For a given machine vision application, such as wheel alignment, it is desirable for the target elements or other visible objects of interest to appear as an intensity within a given range, in the camera image. In a system such as that shown, it is possible to adjust several parameters to modify the resultant intensity to bring the target or other object into the desired intensity range. In the example, the adjustable parameters include the intensity of illumination by the LED array 201, the aperture of the camera 203 and the gain of the camera's internal processing circuitry (typically an analog gain).

In the wheel alignment example, the computer system 111 sends instructions to modify operation of the module 110 or 112, so target elements appear within the desired intensity range. For example, if the intensity in the camera output data appears too low, the computer system 111 can instruct the camera 203 (through the control 209) to change the opening and/or time of opening to increase exposure or to increase gain in the signal processing within the camera. Alternatively, the computer system 111 can instruct the driver circuit 207 (through the control 209) to drive the LED array 201 to emit at a higher level.

In operation, the camera 203 supplies digital image data to the image processing circuitry 211. The image processing circuitry 211 performs gradient calculations on the digital value for each pixel. The resultant gradient data is compressed, for example, using a run length coding technique.

Obviously, other data compression schemes may be used. The image processing circuitry 211 supplies the compressed gradient data to the host communication interface 205, for transmission to the host computer system 111.

In general, the exemplary image processing circuitry 211 provides background subtraction, gradient calculation, and gradient compression at the image sensor output rate. Foreground image buffering is unnecessary. The circuitry 211 may also implement one or more thresholds to truncate data. The resultant data stream requires significantly lower transmission bandwidth and substantially reduces the amount of processing that must be performed by the host. As discussed in detail later, several functions or parameters of the processing are set or modified by operation of the control 209.

Those skilled in the art will recognize that the image processing circuit 211 may be implemented in a variety of different ways, for example using different processing algorithms. It may be helpful, however, to consider a specific example of a image processing circuitry 211, for example, for use in the wheel alignment type machine vision application, in somewhat more detail.

Figure 3:
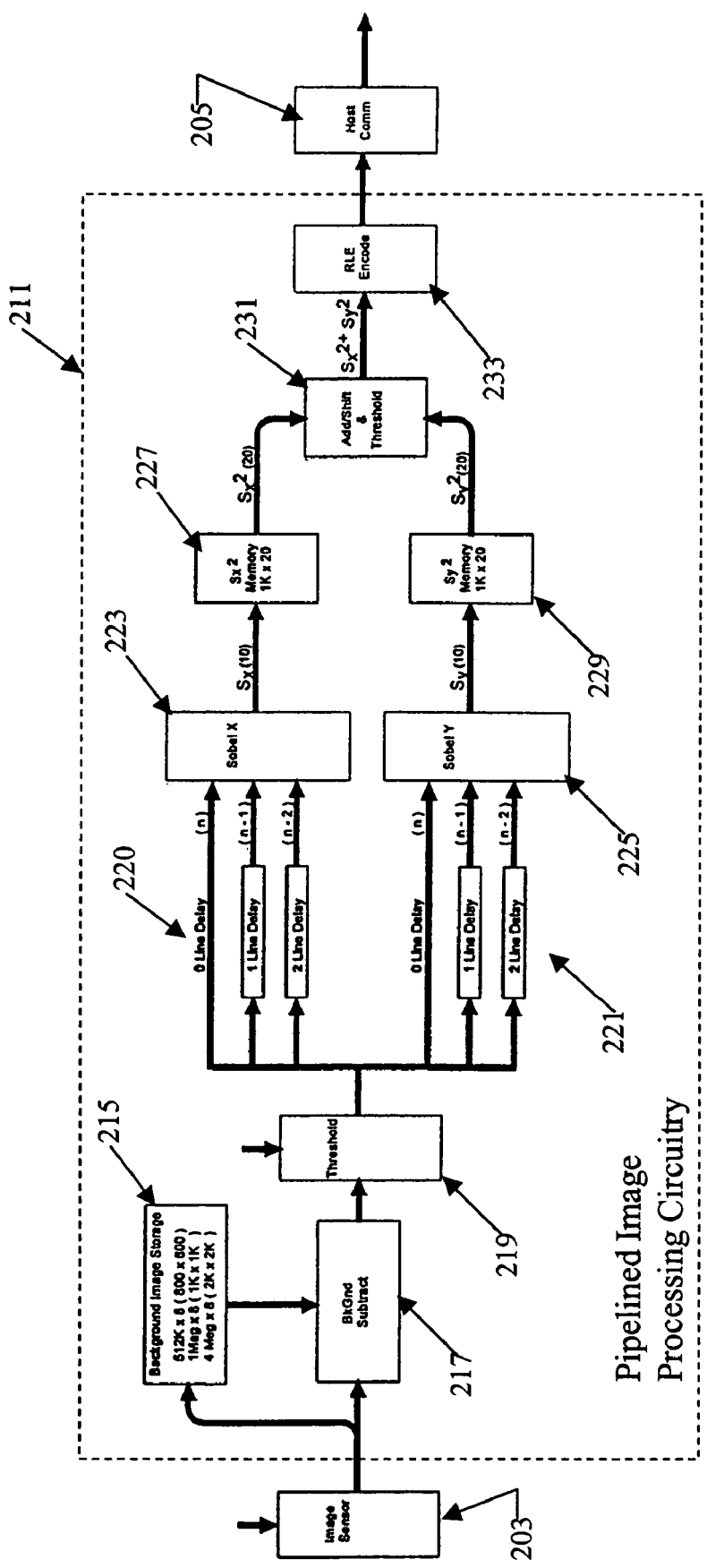
FIG. 3 is a simplified functional block diagram of the image processing elements of the imaging module of FIG. 2.

FIG. 3 provides a more detailed diagram of the functional elements of a pipelined implementation of the image processing circuitry 211 and shows the connection thereof to the image sensor (camera) 203 and to the host communication interface 205. The pipelined version of the image processing circuitry 211 may be implemented by a processor with memory or as a filed programmable gate array (FPGA), where the processor or FPGA is programmed to perform the data processing functions shown in the drawing. Alternatively, the image processing circuitry 211 may be implemented as discrete logic circuits designed to perform the specific processing functions.

The image-sensing device (camera) 203 in the example uses a progressive scan array. The illustrated pipelined image processing circuitry 211 computes sum-of-squares gradient magnitude for each pixel in the array. The circuitry may selectively provide background subtraction and one or more threshold limiting functions. The circuitry also provides data compression.

As previously noted, it is at times desirable to subtract background image data. In the example, "background" is an image taken without the illumination from the LED array 201. The "foreground" is an image taken with the LED array 201 turned on. The background (light off) image is subtracted from the foreground (light on) image. The image data that remains corresponds to the elements in the field of view that are illuminated by and highly reflective to the light from the strobe by the LED array 201. This subtraction takes out distracting objects not relevant to the wheel alignment.

In present embodiments, use of the subtraction operation is software selectable. By sending appropriate commands to the control 209, the host computer system can tell the module 110 or 114 whether or not to do the background subtract operation. For example, the system 111 may instruct the module to always do the background subtract operation, when speed is not an issue. The computer system 111 may tell the imaging module 110 or 112 to take a background image periodically and determine noise. In this second case, if noise is high, the control 209 turns the background subtract operation on. Also, computer system 111 may turn the background subtraction function off, typically when image capture speed is an issue (although this means that more processing must be performed).

To enable the background subtraction, the image processing circuitry 211 includes a memory or other storage element 215 for storing a background image and a subtraction element 217. When turned on via command from the host computer system 111, the background image data is subtracted from the foreground image data. Specifically, a background image (without illumination by LED array 201) is taken and the digital image data from the camera 203 is stored in the memory 215. In response to incoming foreground image data from the sensor 203 (taken with the LED array on), the subtraction element 217 retrieves corresponding pixel data from the memory 215, and subtracts the stored background data from the incoming image data, at the output rate of the camera 203. The subtraction element 217 performs the background subtraction for each pixel in the image array of the sensor/camera 203. The subtraction element 217 may also truncate the results.

The data from the background subtraction element 217 then passes through a software selectable threshold function 219. The level of the threshold is set by the control 209, for example in response to an instruction from the host computer system 111, in a manner similar to setting the background subtraction function on/off. The computer system 111 may cause the module 110 or 112 to set the threshold level during operation, or the module can set the threshold as part of its start-up routine. Pixel intensities below this threshold are considered noise and are set to a fixed constant value, typically the threshold value.

The truncated data from the threshold device 219 then passes through two sets 220, 221 of three delay lines, to inputs of Sobel X filter 223 and Sobel Y filter 225, respectively. Each Sobel filter essentially computes a gradient for each pixel in a line of the image with regard to eight surrounding pixels. In the example, each image line comprises 1000 pixels. To compute the intensity gradient for each pixel, each filter must have the data for the center pixel and the data for the eight pixels surrounding the center pixel. For a given line of the image, each filter, therefore, must have the data for the line currently being processed as well as the data for the immediately preceding line and the immediately following line.

During any given cycle, each filter 223, 225 receives the current data value n as well as values from two previous lines (n−1, n−2). Hence, the delays 220, 221 provide first line, second line and third line, so that each filter 223 or 225 has enough data at the time to compute the gradient values for the second line of pixels from the image (n−1). By inputting three lines to each filter and processing the pixel data for those lines, the implementation does not need to buffer data for an entire image, and the processing circuitry 211 can perform the gradient calculations live in real time at the output rate of the image sensor 203.

The filter 223 calculates the Sobel X ($S_X$) gradient magnitude for each respective pixel in the array. Similarly, the filter 225 calculates the Sobel Y ($S_Y$) gradient magnitude for each respective pixel in the array. The desired gradient magnitude is the sum of the squares of these two values ($S_X$ and $S_Y$). One embodiment for obtaining the squares of these values is by looking up the squared values in tables indexed by the un-squared values. The embodiment of pipelined image processing circuitry shown in 211 includes memories 227, 229 storing such lookup tables. The data from the Sobel X filter 223 is used as an input to memory 227 to lookup the square ($S_X^2$) of the Sobel X ($S_X$) gradient value. Similarly, the data from the Sobel Y filter 225 is used as an input to memory 229 to lookup the square ($S_Y^2$) of the Sobel Y ($S_Y$) gradient value. Another embodiment (not shown) could use multiplying devices to produce these squares.

A processing element 231 receives the squared data. This element 231 first performs an addition to compute the sum of the squares ($S_X^2+S_Y^2$) of the X and Y gradient data. The processing element 231 then shifts and performs a thresholding operation on the sum of squares data to clip the shifted data to conform to the maximum magnitude for each output pixel. The magnitude (number of bits) and/or the threshold level may be set in software by the control 209, in a manner analogous to that of the background subtraction (at 217) and/or the first threshold (at 219). The Sobel filtering and sum of squares gradient calculations may be performed in discrete hardware using commercially available chips or programmed into a field programmable gate array (FPGA) or an application specific integrated circuit (ASIC).

The pipelined image processing circuitry 211 also includes a compression engine. A variety of different compression schemes may be used. In this example, compression engine is a run length encoder 233. Those skilled in the art will recognize that other forms of compression may be used along or in combination with run length encoding. In this example, the encoder 233 performs run length encoding (RLE) on the sum of squares data ($S_X^2+S_Y^2$) output by the processing element 231 after the shifting and threshold processing. Those skilled in the art will recognize that other data compression techniques may be used. The run length encoder 233 supplies the compressed gradient data to the host communication interface 205, for transmission over the link to the host computer system 111.

The host computer system 111 decompresses the received data stream, essentially to reverse the run length encoding and thereby recover the gradient data. Starting from the gradient data, the computer system 111 performs calculations based on the edges of the imaged target elements (dots) as defined by the gradient maxima, to find the centroids of these target elements (dots). The computer 111 uses these centroids to determine the angle/position of the targets in space in each captured image. Then, the computer uses that information to calculate wheel alignment. The image processing formulas are the same as in earlier wheel alignment systems, except that instead of doing much of the calculation on the image processing board or entirely in the host, the imaging module does only the gradient, and the host performs the remaining computations. Detailed discussions of the computations, for a wheel alignment application, are discussed in several of the cited patents.

A host system 111 may be implemented on a specifically designed processing system, but in the example, it is implemented by a general-purpose computer controlled by software programming. Of course any of a number of different types of computer may be used, for wheel alignment or other machine vision application, however, the example utilizes a device within the class commonly referred to as a personal computer or "PC." Although those familiar with the machine vision art and/or the data processing art will generally be familiar with such computers and their associated software, it may be helpful to summarize the structural and functional aspects thereof as they might relate to the wheel alignment example of FIG. 1.

FIG. 4 is a functional block diagram of a PC or workstation type implementation of a host computer system 251, which may serve as the host computer 111. In such an application, one function of the system 251 is to process compressed gradient image data from the camera modules to determine wheel alignment parameters. The system may run a number of other programs that are useful to the mechanic and/or other personnel in the auto shop.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a PC type implementation, for example, at least one mass storage system 255 in the form of a disk drive or tape drive, stores the operating system and application software as well as data. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications. For purposes of the wheel alignment application, the interface 259 provides two-way data communications with one or more of the imaging modules 110, 112. For example, the interface 259 may be a USB hub providing two or more ports for USB cable links to/from the imaging modules 110, 112. Although not shown, another communication interface may provide communication via a network, if desired. Such an additional interface may be a modem, an Ethernet card or any other appropriate data communications device.

The physical links to and from the communication interface(s) may be optical, wired, or wireless. For example, in a typical wheel aligner application, the imaging modules typically connect via USB cables. However, infrared, RF, and broadband wireless technologies may be used for these links. Any external communications may use hard wiring or wireless technologies.

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system 111 typically would include a port for connection to a printer. The input control devices for such an implementation of the system 251 would include the keyboard 258 for inputting alphanumeric and other key information. The input control devices for the system 251 may further include a cursor control device (not shown), such as a mouse, a trackball, stylus, or cursor direction keys. The links of the peripherals 257, 258 to the system 251 may be wired connections or use wireless communications.

The computer system 251 typically runs a variety of applications programs and stores data, enabling one or more interactions via the user interface, provided through elements such as 257 and 258 to implement the desired processing. For machine vision applications, the programming will include appropriate code to process the compressed gradient image data to produce the desired machine vision results. For example, when used to implement the host computer 111 for the wheel alignment system the programming enables the device 251 to process the compressed gradient image data to determine the desired alignment parameters. The host 111 will typically run an application or shell specifically adapted to provide the user interface for input and output of desired information for alignment and related services. As noted, because it is a general purpose system, the device 251 may run any one or more of a wide range of other desirable application programs, some of which may involve machine vision but many of which may not.

The components contained in the computer systems 251 are those typically found in general purpose computer systems used as servers, workstations, personal computers, network terminals, and the like. In fact, these components are intended to represent a broad category of such computer components that are well known in the art.

At various times, the relevant programming for the machine vision processing and any related application(s) such as the wheel alignment application may reside on one or more of several different media. For example, the programming may be stored on a hard disk and loaded into RAM for execution. The programming also may reside on or be transported by other media for uploading into the system 251, to essentially install the programming. Hence, at different times all or portions of the executable code or data for any or all of these software elements may reside in physical media or be carried by electromagnetic media or be transported via a variety of different media to program the particular system.

As used herein, terms such as computer or machine "readable medium" therefore refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in the computer 251 of FIG. 4. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The following is a discussion of the circuitry of an example of the imaging module, specifically the camera board and an FPGA used for the pre-processing in the camera board.

Exemplary Circuit for the Camera Board

Figure 5:
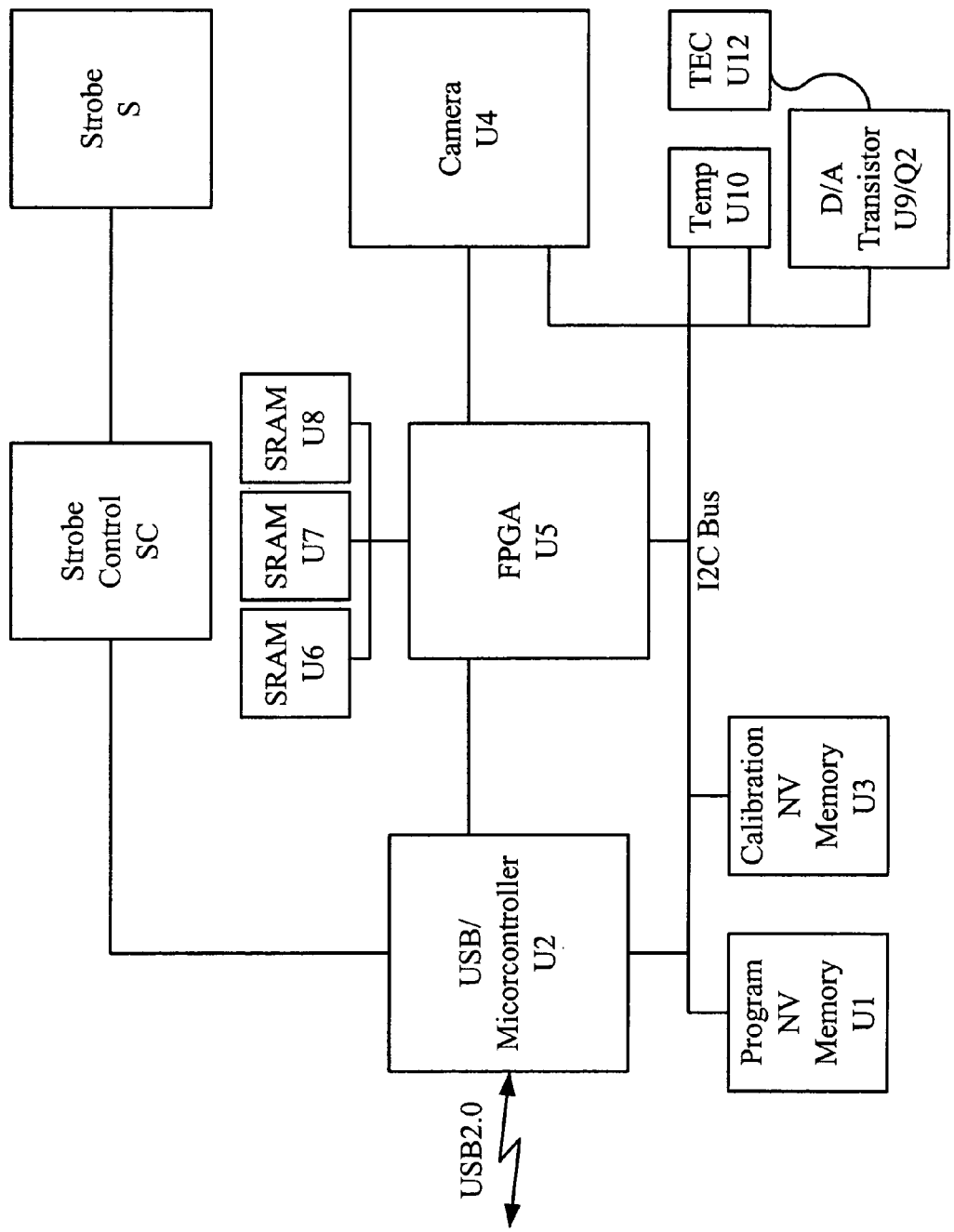
FIG. 5 is a functional block diagram of the circuitry of an image sensing module.

The embodiment of FIG. 5 uses a combined Controller/USB interface in the form of an integrated circuit (U2), whose functions include a micro controller and a USB2.0 interface. The USB interface can be configured to perform with minimal interaction with the micro controller. The micro controller is used to configure and control the camera and image processing circuits, to control cooling circuits, and provide diagnostic information. Also associated with the micro controller are two nonvolatile memory circuits (U1 and U3). U1 is used to store program code, currently a bootloader for the micro controller. U3 is used to store calibration/security data associated with the camera assembly.

In this example, the camera (U4) is a CMOS image array with integrated analog to digital converter. The camera chip is configured for a region of interest (ROI) within the field of view, gain, and timing via the I2C bus from the Controller/USB (U2). Image acquisition is triggered from a single line (referred to as 'FREX') routed through the FPGA.

The pre-processing functions are implemented by a circuit block consisting of a field programmable gate array (FPGA) (U5) and three static random access memory (SRAM) chips (U6, U7, U8) performing the functions of Background Subtraction, Gradient Processing, and Data Reduction/Compression, as discussed in detail above. This circuit (U5) is configured by the controller and thereafter autonomously processes an image into gradient data for transmission. Image acquisition is triggered by the controller driving a START line (not separately shown for convenience). The strobe (S) is activated as long as the line is high. When START transitions low a frame is requested from the camera. The first frame or "foreground image" is stored in SRAM memory. A second frame is requested and this "background image" is subtracted from the first image. The difference data is then processed via X and Y Sobel filters whose outputs are squared and then summed to provide gradient data. This data is then reduced to provide only data points in regions that have gradient above a threshold set by the controller. Attention is directed to the discussion of FIG. 3, above.

The FPGA (U5) controls the taking of the second (background) image without further intervention from the microcontroller (U2). The FPGA (U5) also provides the pixel intensity summation data to the microcontroller (U2) to facilitate image intensity control.

The present example of the imaging modules (FIG. 5) incorporates active cooling of the electronic circuitry, particularly that of the camera (U4). The primary cooling components are temperature sensor (U10), a Peltier device or thermoelectric cooler (TEC) (U12), and the drive circuits of a D/A (U9) and transistor (Q2). The temperature sensor U10 supplies the controller circuit with digital data of the temperature via the I2C bus. The controller sets the drive level for the TEC cooler (U12). The driver circuit for the TEC is a digital to analog converter U9 on the I2C bus, which drives the base of a PNP transistor Q2. Temperature control is done via software in the controller/USB device (U2). An earlier design was done with temperature control being accomplished with an autonomous circuit using a temperature sensitive resistor (PTC) to regulate the current from the base of the driving transistor. This circuit was replaced with the described digitally controlled circuit to allow the system to monitor the temperature of the camera and to achieve better and more flexible temperature control.

For power, the voltages supplied to the board are 12V for the strobe (S) and 5V which is regulated down to 1.8V and 3.3V via a dual switching regulator in the buck configuration. The 5V line is also used to supply the cooling circuit.

The strobe control circuit (SC) is a current regulated switch. The entire strobe circuit is optically isolated from the rest of the board. There is also a circuit to drain the energy from the strobe circuit when power is removed from the board.

The primary circuit elements are a PNP transistor (Q3), a sense resistor (R25), a comparison resistor (R23), and an amplifier (U15). The transistor Q3 controls the current passed to the strobe. The voltage drop across the sense resistor R25 and the voltage drop across the comparison resistor R23 are compared and amplified by the amplifier and used to drive the Q3 transistor base. The strobe is turned on/off by gating the current through the comparison resistor (R23). This is accomplished by using the optoisolator U16. Another resistor (R27) is added in series with the comparison resistor and a diode (D26) is placed in parallel with this pair of resistors (R23 R27) to provide some immunity from power supply and on/off gate voltage variations. R24 is used to reduce the current requirements for the comparison circuit. R21 and R22 are used to force the amplifier/transistor to shut off when current through the comparison resistor is shut off. R26 and C75 are used as a snubber circuit to reduce ringing and electromagnetic interference.

The optical isolation of the strobe circuit from the other circuits prevents the power from the strobe circuits feeding back into the logic circuits and damaging them. This allows "hot plugging" the circuits without damage. It also reduces the problems of surge currents in the strobe affecting the image accuracy and operation of the other circuits.

The circuit around Q1 is used to drain the energy storage capacitor C74. When the 5V supply is no longer active the optoisolator U14 will turn off. R16 will pull the base of Q1 high and Q1 will gate current from C74 through R17 and R18. R17 and R18 were paralleled here to accommodate worst case power dissipation.

This exemplary circuit enables configuration of the hardware (FPGA) from the host, as a regular function. This allows us to change the hardware configuration to perform special processing at will. The FPGA offers the option to use the same physical hardware and change its configuration to suit the needs of the application. This makes the camera system much more flexible. The configuration can be changed to aid in performing diagnostics for example. Additionally, the same physical camera could have one configuration for wheel alignment and then be reconfigured via software to do edge detection for frame/body work. Should the image processing algorithms change, it is possible to communicate the new configuration data as part of a software update.

Exemplary FPGA for the Camera Board (Functional Description)

This description will follow the data path of the FPGA. 10 bits of camera data are fed through a multiplexer such that 8 bits are selected for processing. If any of the camera bits of higher order than those selected for processing is set, the 8 bit value is set to 255. These 8 bits are latched into a FIFO with the pixel clock supplied by the camera chip. This same pixel clock is used to increment row/column counters for the control section to determine when a frame is completed.

Figure 6:
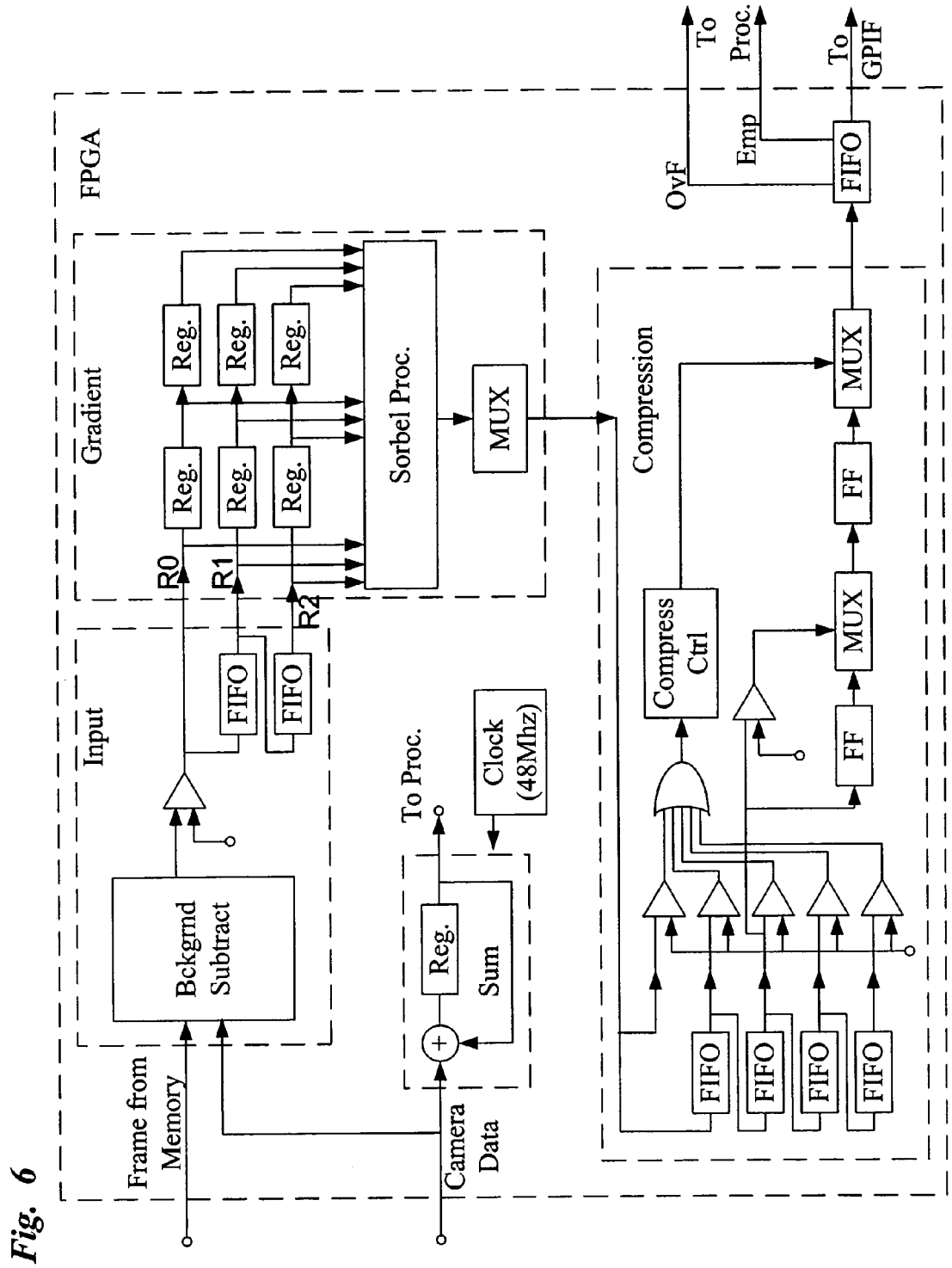
FIG. 6 is a functional block diagram of an FPGA, which may be used in the module of FIG. 5.

The actual processing section is divided into four primary sections: Sum, Input, Gradient, and Compress. These sections are driven with a 48 MHz clock, which is twice the maximum data rate of the camera. FIG. 6 is a block diagram of these functions implemented/performed in the FPGA.

Sum: The sum section consists of an adder that adds the 8 bits of camera data during the strobed frame to a 32-bit register. This register is cleared at start of frame. The value in the register may be read out via the serial data line. The purpose of this section is to supply data to the processor to allow adjustment of the strobe duration. This section runs in parallel with the Input section.

Input: This section performs the background subtraction, background threshold, and arranges the input into three rows of data for output to the gradient section. This section takes the 8 bits of camera data. The first frame of camera data is assumed to be a strobed image. This data is stored in frame memory off the FPGA chip. The second frame coming in is assumed to be the background image. As each byte is delivered, it is subtracted from the stored value for that pixel in the frame memory and the 8 result is compared to an 8 bit register value set by the processor. This 8-bit register is referred to as the background threshold. If the result of the subtraction is negative or less than the background threshold, a zero is passed through. These limited values are passed through two row FIFOs such that three output values are made available to the next section. These values are labeled R0, R1, and R2. R0 is the top row, R1 the middle row, and R2 the bottom row. The processing and FIFOs result in this section having a pipeline delay of X+(2*Row-Width). The items 220 and 221 in FIG. 3 are essentially combined and only the two FIFOs are required in the Input section of the FPGA in FIG. 6. The use of the two FIFOs is cheaper than six.

Gradient: The gradient section calculates sum of the squared X and Y Sobel values for a given pixel. This section takes in three row values as output from the Input section. These three values are each clocked through two registers such that 9 values are available for processing. These values can be referred to as X0Y0 through X2Y2. The processing performed can be represented as:

| | |
|---|---|
| topLbotR=X1Y1−X3Y3; | // signed 9 bit result |
| topMbotM=(X2Y1−X2Y3) * 2; | // signed 10 bit result |
| botLtopR=X1Y3−X3Y1; | // signed 9 bit result |
| midLmidR=(X3Y2−X1Y2) * 2; | // signed 10 bit result |
| X2=topLbotR+botLtopR; | // signed 10 bit result |
| X2=X2+midLmidR; | // signed 11 bit result |
| X2=X2*X2; | // signed 22 bit result |
| Y2=topLbotR−botLtopR; | // signed 10 bit result |
| Y2=X2+topMbotM; | // signed 11 bit result |
| Y2=Y2*Y2; | // signed 22 bit result |
| RESULT=X2+Y2; | // signed 23 bit result |

8 bits of RESULT are then selected through a multiplexer for output. If any RESULT bits of higher order than those selected is set, then the output will be set to 255. Pipeline delay of Gradient is x clocks.

Compression: This section compresses the data stream. Input is a stream of 8 bit words. The input stream is fed through a 4 FIFOs such that we have 5 row inputs. These five inputs are compared to a Compression Threshold value set by the processor. If any of these five row inputs is over threshold, the two preceding values, the current value, and two following values from the middle (row 3) are to be sent. If the next set of row inputs is over threshold, then the two values following it are to be sent. The result is that all values over threshold and their adjacent values within a radius of two are sent.

All values not to be sent are considered 0. Any time a 0 is encountered the next byte is a skip count. Skip count represents the number of additional bytes of zero value. The skip count will not extend beyond the frame. A zero that is to be sent due to proximity to a value over threshold may be sent as a 1.

If the last byte of the frame is a zero and the skip count following it would be zero, that byte may be sent as a 1. A single byte of data below threshold MAY be sent as a 1.

The output of the compression section feeds a FIFO that is read by the processor's GPIF (General Purpose Interface) section. The GPIF section provides an interface to certain types of micro controller that may be used as the controller 209. If the compression section attempts to write into the FIFO when it is full then the nOVERFLOW line will toggle and the FPGA will halt processing. The EMPTY line will be asserted if there is no data for the GPIF to read.

The processing in the embodiment of FIGS. 5 and 6 is not entirely pipelined in nature. The camera generates data at a rate faster than it could be shipped via USB, and system performance is better if the FPGA pipelines just the background subtract and then buffers the subtracted image.

As noted earlier, the FPGA can be dynamically reconfigured to allow the hardware to meet other image processing requirements. For example, it is also possible to implement the strobe control function in the FPGA. The FPGA can limit the duty cycle of the strobe to prevent overheating. The timing of the strobe relative to the camera framing can be more tightly controlled. The timing requirements of the background (dark) frame may be more precisely matched to the foreground (illuminated) frame. The FPGA could also stream multiple processed frames without further intervention.

Figure 7:
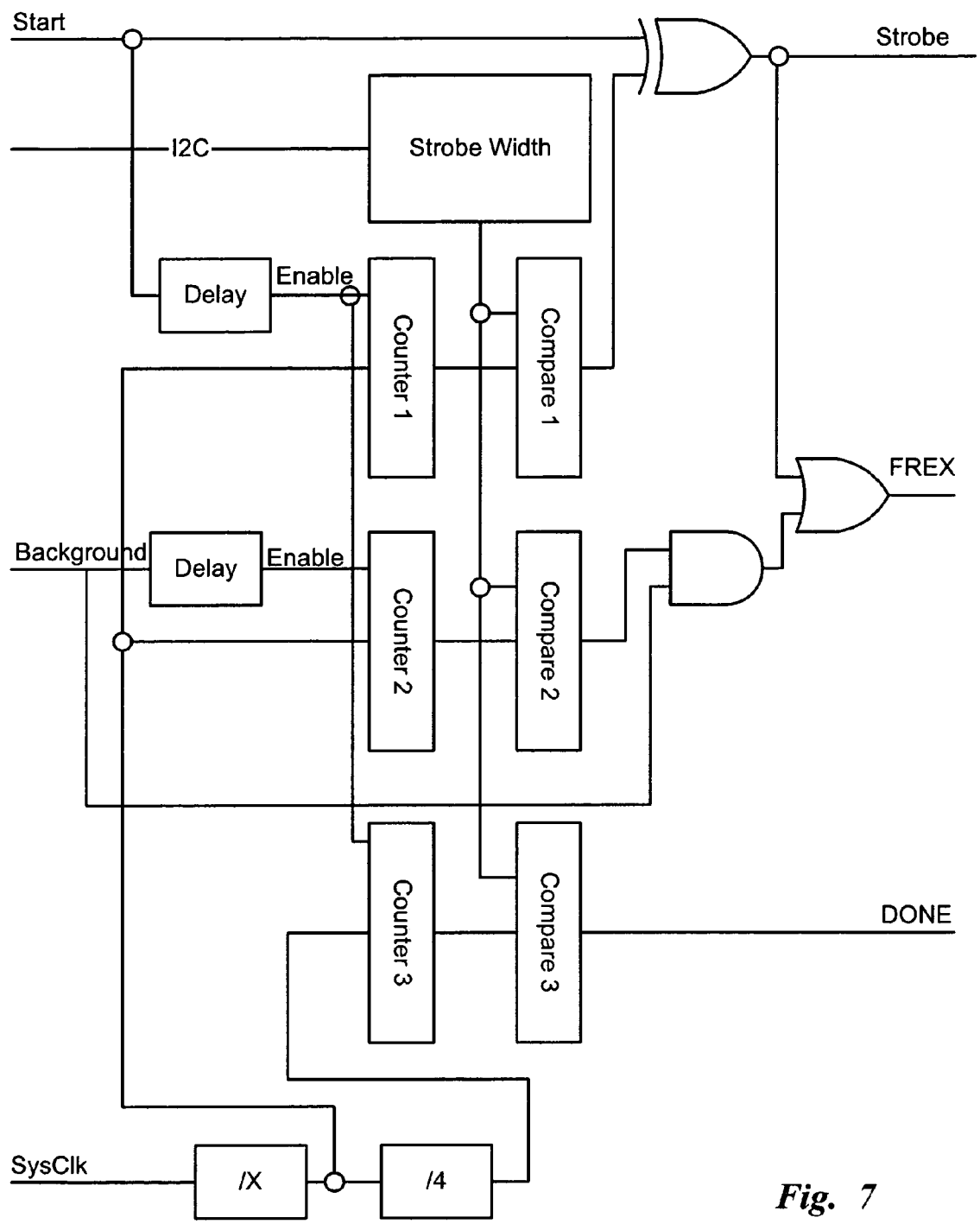
FIG. 7 is a functional block diagram of a strobe control, for example, as might be implemented as additional functions in an FPGA

FIG. 7 is a functional block diagram illustrating the logic of a strobe control circuit, which may be implemented as a separate circuit or implemented as additional programmed functions of the FPGA. As shown, the processor sets the strobe width (or time period) via an I2C signal, just as it sets the other thresholds and settings of the FPGA. A Start signal activates the Strobe and starts counter 1 after a preset delay. The delay is used to make the transitions of FREX fall within certain parameters required by the camera chip. The output of counter 1 is compared to the strobe width, and when they are equal the strobe output and FREX outputs fall telling the camera chip to start transmitting frame data.

The output of compare 3 also starts counter 3. Counter 3 has its clock divided by 4. After 4 strobe periods, the done signal is presented to the processor so that the duty cycle of the strobe will be 1 in 5 (on one strobe period and then off for 4).

When the foreground frame is processed, the background signal is activated raising FREX but not the Strobe signal. Counter 2 is compared with the strobe width, and when they are equal, FREX falls telling the camera chip to start transmitting the background image.

Those skilled in the art will recognize that the concepts disclosed herein have wide applicability and may admit of a wide range of modifications. For example, a machine vision technique such as outlined above could be implemented for other types of alignment processes (e.g. wing alignment) as well as for a wide range of other types of machine vision applications, such as product assessment in a manufacturing operation, code or character recognition in document or mail piece handling systems, etc.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

What is claimed is:

1. In a wheel alignment system having an image sensing module and a host for providing a vehicle wheel alignment parameter in response to data communicated from the image sensing module, an improvement in the image sensing module, wherein the image sensing module comprises:
   an image sensor for capturing images;
   image processing circuitry, coupled to the image sensor, for processing the images; and
   a local area network data communication interface coupled to the image processing circuitry for sending processed image data to the host and for receiving information to establish a configuration of the processing by the image processing circuitry.

2. The improvement as in claim 1, wherein the processing by the image processing circuitry is capable of being dynamically reconfigured to meet different image processing requirements.

3. The improvement as in claim 1, wherein the local area network data communication interface comprises an Ethernet interface.

4. The improvement as in claim 1, wherein the local area network data communication interface comprises a broadband wireless data communication interface.

5. The improvement as in claim 1, further comprising a controller coupled to the image processing circuitry, for controlling operation of the image sensing module.

6. The improvement as in claim 5, further comprising an illumination source coupled for selective activation by the controller, for selective illumination of an object of or on a subject vehicle.

7. The improvement as in claim 1, comprising the further improvement wherein the host is a laptop or handheld type computer.

8. The improvement as in claim 1, wherein the image processing circuitry comprises a processor and memory capable of being dynamically programmed to reconfigure the processing by the image processing circuitry to meet different image processing requirements.

9. The improvement as in claim 1, wherein the image processing circuitry comprises a field programmable gate array (FPGA), which is capable of being dynamically reconfigured to meet different image processing requirements.

10. An imaging module for use in a system implementing a vehicle measurement application, the imaging module comprising:
   an image sensor, for imaging a field of view encompassing an object of or on a subject vehicle and generating representative image data;
   image processing circuitry, coupled to the image sensor to receive the representative image data, for processing information from the representative image data in accord with a configuration, to form processed data; and
   a data communication interface configured for transmitting the processed data from the image processing circuitry to a host implementing the vehicle measurement application and for receiving information to establish the configuration of the processing of the image processing circuitry.

11. The imaging module of claim 10, wherein the interface is a local area network interface.

12. The imaging module of claim 11, wherein the local area network interface supports either Ethernet data communications or broadband wireless data communications.

13. The improvement as in claim 10, further comprising a controller coupled to the image processing circuitry, for controlling operation of the image sensing module.

14. The improvement as in claim 13, further comprising an illumination source coupled for selective activation by the controller, for selective illumination of the object.

15. A vehicle measurement system, comprising:
at least one imaging module, comprising:
1) an image sensor, for imaging a field of view encompassing at least one object of or on a subject vehicle and generating data representing the imaged field of view;
2) image processing circuitry, coupled to the image sensor to receive the data representing the imaged field of view, and for performing a processing operation on information from the data representing the imaged field of view in accord with a configuration, to form processed data; and
3) a data communication interface configured for transmitting the processed data from the image processing circuitry and for receiving information to establish the configuration of the processing operation of the image processing circuitry; and a host coupled to receive the processed data transmitted from the at least one imaging module, configured for processing the received data to provide at least one measurement of a parameter of the subject vehicle.

16. The system of claim 15, wherein the interface is a local area network interface.

17. The system of claim 15, wherein the local area network interface supports either Ethernet data communications or broadband wireless data communications.

18. The system of claim 15, wherein the host comprises a laptop or handheld type computer.

19. The system of claim 15, wherein the processing by the image processing circuitry is capable of being dynamically reconfigured to meet different image processing requirements.

* * * * *